July 7, 1925.  1,544,712
J. ZWICKY
SEPARATING DEVICE PARTICULARLY FOR FREEING PETROL FROM WATER
Filed Dec. 22, 1924   5 Sheets-Sheet 4

INVENTOR.
Jean Zwicky
by A. L. Odell
Attorney.

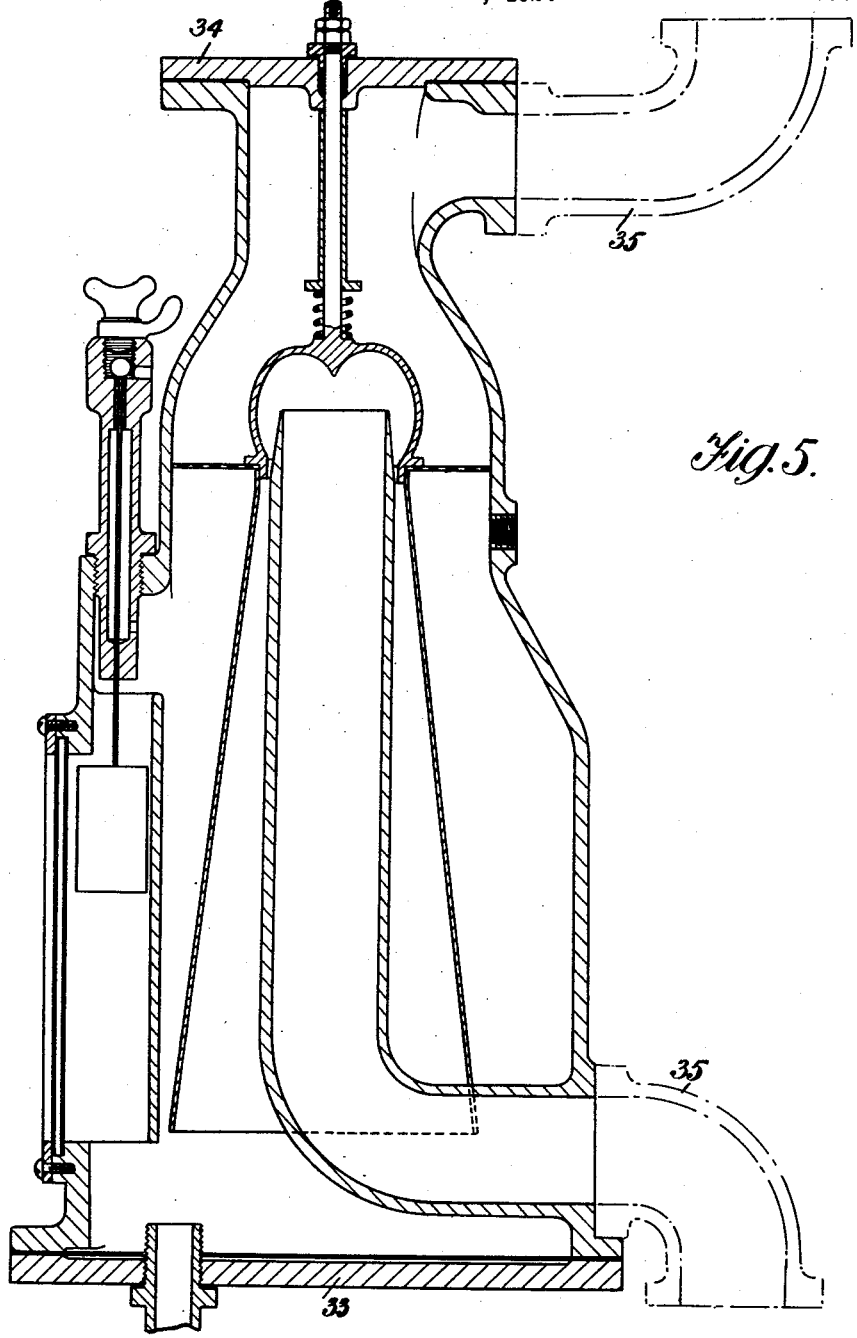

Patented July 7, 1925.

1,544,712

UNITED STATES PATENT OFFICE.

JEAN ZWICKY, OF MAIDENHEAD, ENGLAND.

SEPARATING DEVICE PARTICULARLY FOR FREEING PETROL FROM WATER.

Application filed December 22, 1924. Serial No. 757,553.

*To all whom it may concern:*

Be it known that I, JEAN ZWICKY, a citizen of the Swiss Republic, residing at White Cottage, Bridge Road, Maidenhead, Berkshire, England, have invented new and useful Improvements in Separating Devices Particularly for Freeing Petrol from Water, of which the following is a specification.

This invention relates to a separating device particularly intended for removing water from petrol.

The invention comprises means for delivering the fluid to be treated at a relatively high velocity into a collector chamber of relatively large area, for substantially reversing its direction of motion while it is travelling relatively slowly in said chamber, and for maintaining the velocity of delivery into the chamber substantially constant in spite of variations in the quantity of fluid forwarded to the separator.

The invention further comprises the combination, with an inlet pipe entering a collector chamber, of a deflector enveloping the end of the inlet pipe and forming therewith a constricted channel.

The invention further comprises the combination, with an inlet pipe delivering into a collector chamber, of an automatically adjustable deflector forming and directing the fluid into a constricted channel, the area of which is varied automatically in accordance with the quantity of fluid supplied to the separator.

Figure 1:
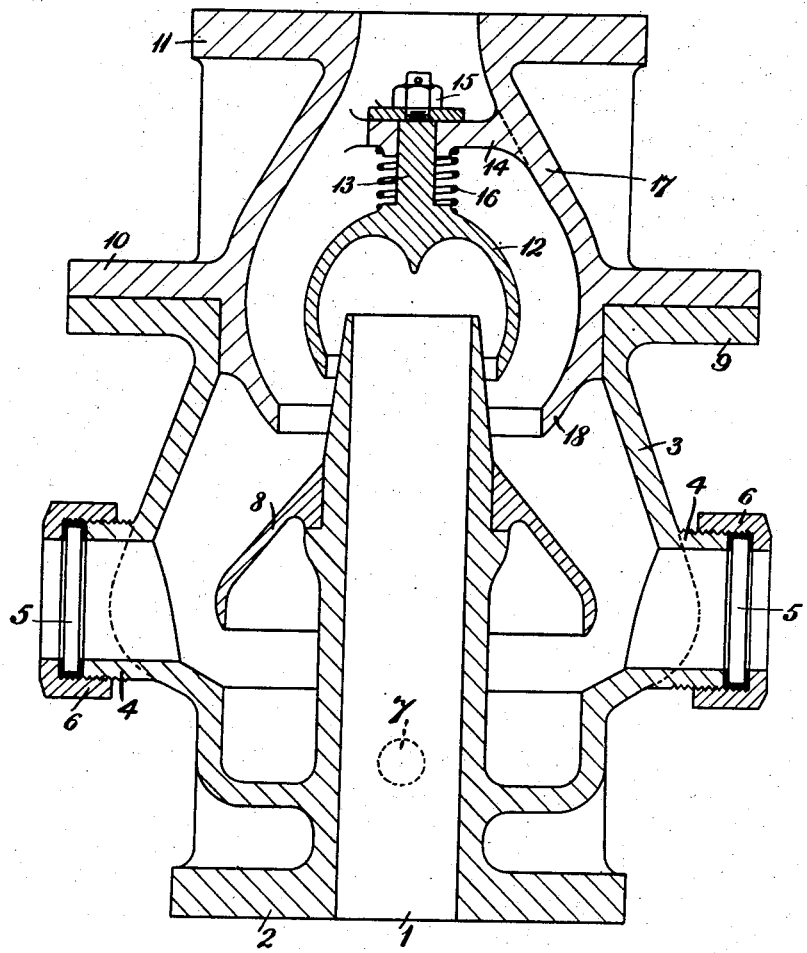

These and other features characteristic of the invention will appear from the following description which has reference to the accompanying drawings illustrating constructions of the invention adapted for insertion in a straight length of pipe;

Figure 1 being a longitudinal axial section of one form.

Figure 2:
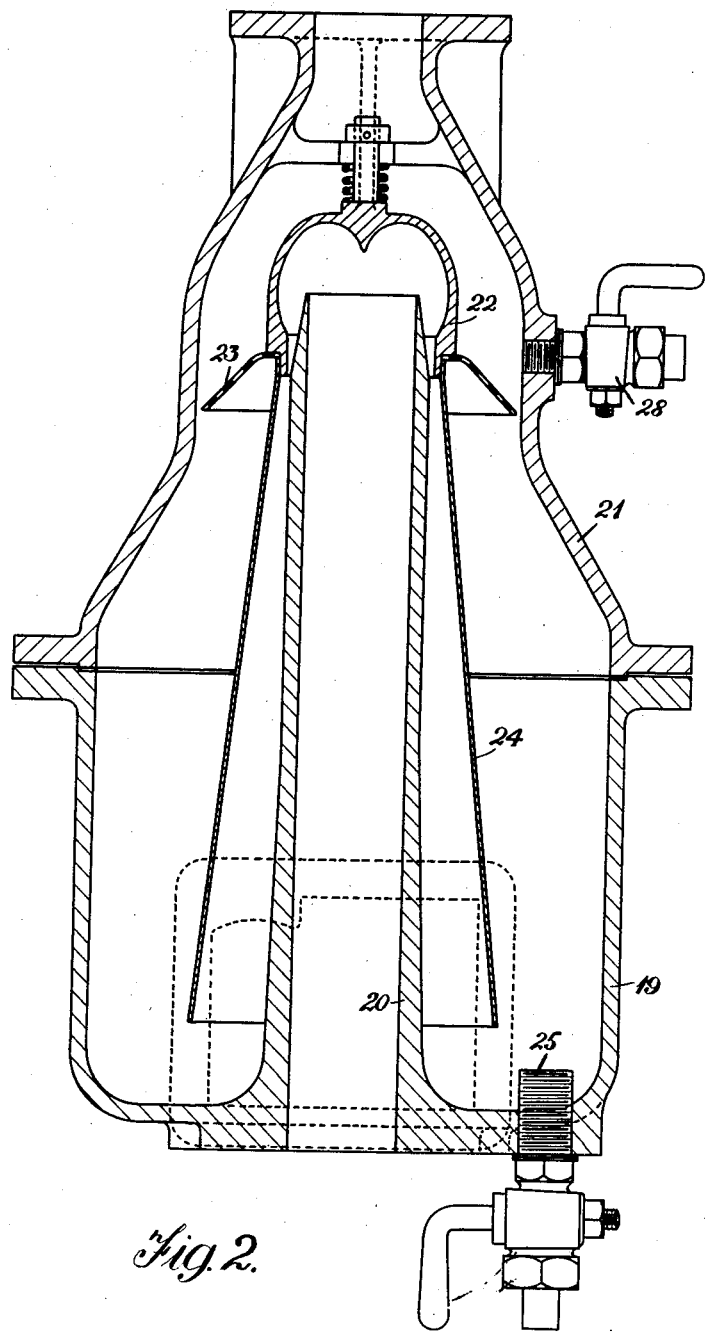

Figure 2 a longitudinal axial section, and

Figure 3:
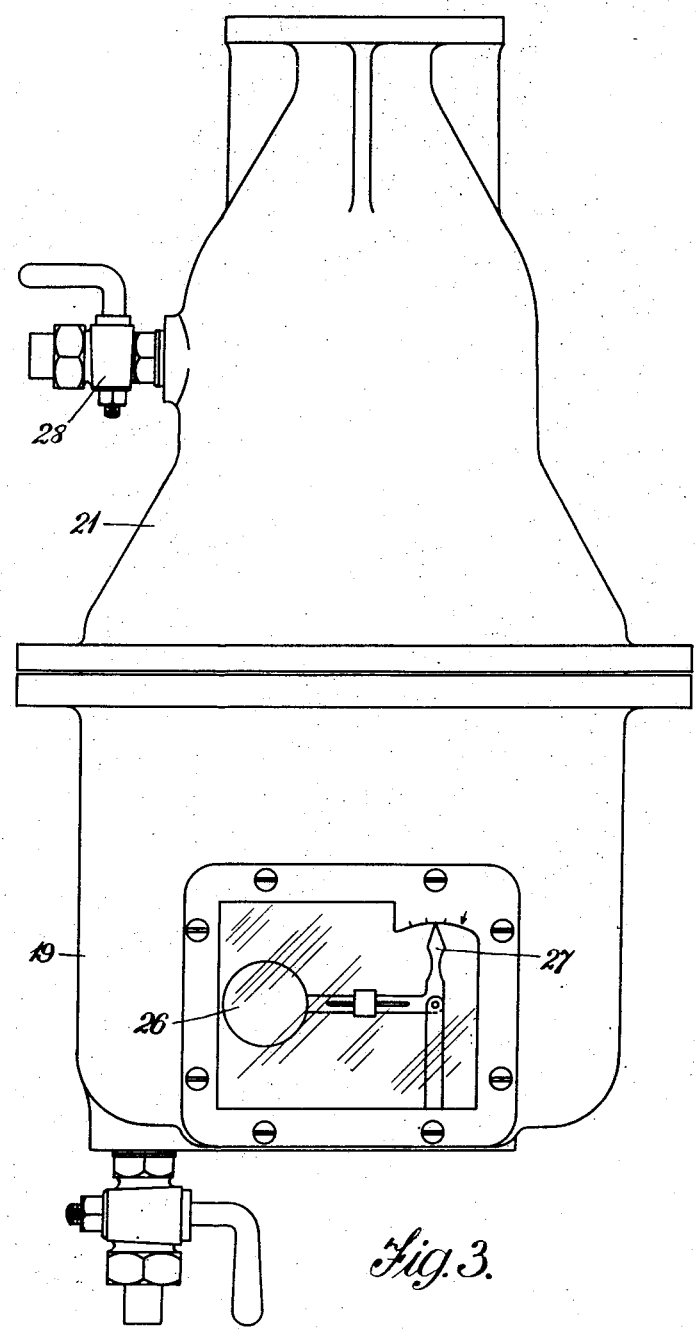

Figure 3 an elevation of a second form.

Figure 4:
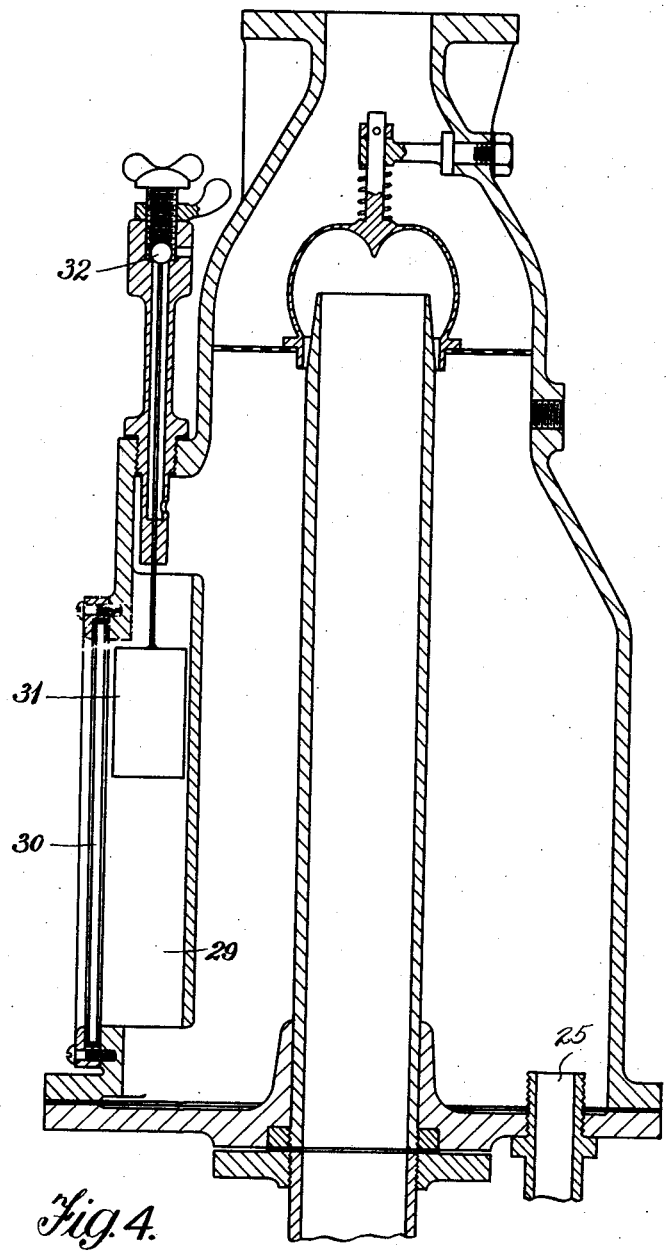

Figure 4 a longitudinal axial section of a third form, and

Figure 5 a similar section of a modification of the construction of Figure 4.

In Figure 1 the lower portion of the device or collector comprises a straight inlet channel 1 having a flange 2 for connection to the supply pipe and a surrounding mantle 3 which encloses between itself and the channel 1 a collecting chamber of relatively large cross sectional area. The collecting chamber is provided with inspection openings which take the form of threaded tubulures 4 closed by glass discs 5 retained in place between rubber washers by cap rings 6. It has also a drain cock at 7. Upon the inlet channel 1 there is fastened a conical shield 8. At its upper end the collector 3 terminates in a flange 9.

Upon this flange there is fastened a deflector chamber which is similarly flanged at 10, and at its upper end has a flange 11 for connection to an outlet pipe. It also makes a spigot joint with the collector chamber. The deflector proper consists of a cup 12 facing and partly enclosing the end of the inlet channel. The cup is of circular cross-section in a plane at right angles to the axis of the channel; and in the plane of the axis of the channel it is, as shown, substantially of inverted cup shape but the centre of its base projects downward and tapers to a point in line with the axis of the channel. Its mouth somewhat closely surrounds the end of the inlet channel and the surfaces of the two adjacent parts are mutually inclined; in the construction shown, by the coning of the outer surface of the inlet channel 1. Thus by adjustment of the deflector 12 towards or from the inlet channel the area of the annular passage between the two may be varied. The deflector has a stem 13 by which it is mounted in a web 14 in the collector. Its position may be adjusted by means of a nut 15. It is normally pressed towards the inlet channel by a spring 16 but can yield against the action of the spring. The body of the collector 17 substantially conforms to the shape of the cup, with preferably a rather more pronounced inwardly turned lip 18.

The petrol or other fluid to be purified is preferably drawn through the device by means of a suction pump beyond it. It ascends the inlet channel 1 and its direction of motion is then reversed by the deflector 12 by which it is directed through the narrow annular passage between the deflector and the coned surface of the inlet channel. It thus issues at a high velocity into the wide space of the collector chamber and in that chamber it must return substantially upon itself in order to find its way over the lip 18 to the outlet beyond the deflector.

If desired the lip 18 may be perforated for the return stream. In the collector chamber the stream of fluid loses its velocity as well as being changed in its direction of motion. Consequently any heavier particles contained within it, as particles of water, tend to be projected further downward, and are left behind when the fluid changes direction. The water thus separated from the petrol collects at the bottom of the collector chamber and can be drained off from time to time through the opening 7 when that operation is seen to be necessary through the inspection glasses. The cone 8 serves to protect the lower part of the collector chamber from being disturbed by the incoming high velocity stream, so that the water having once separated is not stirred into the petrol again. The deflector 12 may be adjusted by trial until the desired effect is attained within the collector chamber. Also, if the velocity of the incoming fluid should increase the deflector can yield against the action of its spring so as to increase the area of the narrow annular passage which determines the velocity of its entry into the collector.

It will be apparent that the deflector 12 is only necessary because the fluid is to leave the device in the same direction as that in which it enters.

In the construction shown in Figures 2 and 3 there is again a collector chamber 19 with an inlet channel 20, and a deflector chamber 21 with deflector 22 facing and surrounding the mouth of the inlet channel. The deflector is fitted with a perforated cone 23 which helps to check turbulence in the collector chamber, and other similar baffles may be fitted at intervals in the length of the collector chamber if desired. The drain outlet 25 projects a short distance above the bottom of the collector chamber so that not all of the collected water can be removed. The advantage of this is that water films enclosing minute air bubbles which might otherwise not be removed from the petrol are broken down on touching the water surface so that the air is freed and the water remains. To ensure such bubbles being brought down to the water surface a conical guide 24 may be provided.

In place of the inspection openings before described the lower part of the collector chamber is fitted with an adjustable float 26 operating an indicator 27, which shows when the drain cock should be used. A cock 28 upon the deflector chamber permits the admission of air to this chamber when desired, so breaking the vacuum and preventing the suction pump from lifting fluid. The collector chamber is made of greater depth than in Figure 1 and requires to be emptied less frequently.

The construction of Figure 4 is generally similar to that of Figures 2 and 3. In place of the float 26 and indicator 27 there is provided in a separate compartment 29 of the collector chamber, which is closed by a glass panel 30, a float 31 which serves to lift a ball valve 32 by which communication is made to the atmosphere from the interior of the collector chamber. By this means air is admitted to the chamber with consequent destruction of the vacuum, so that the supply of fluid is automatically cut off in this way when the accumulation of impurity reaches a predetermined level.

The construction of Figure 5 is generally similar to that of Figure 4, except for a modification of the inlet and outlet which make it unnecessary to break the flange joint connections to the main fluid pipe when it is desired to clean or adjust the internal parts of the device. To allow access to its interior, cover plates 33 and 34 are provided at top and bottom, the device being off-set from the main fluid pipe by means of elbow sections 35.

Though the forms of apparatus illustrated are specially designed for removing water from petrol, it will be understood that the invention is also applicable to the separation of other fluids which differ in density, or to the removal of solid matter from a fluid; for instance the device may be designed to serve as a steam separator, or to remove sand from water.

I claim:—

1. In a separator, the combination of an inlet pipe, a collector chamber of large area, a constricted channel connecting said inlet pipe with said collector chamber and delivering fluid in a downward direction, an outlet pipe connecting with the top of said chamber, and means for varying the area of the constriction in accordance with the quantity of fluid traversing the separator.

2. In a separator, the combination of an inlet pipe, a collector chamber of large area, an outlet from said chamber, a constricted channel delivering from said inlet pipe into said chamber in a direction substantially opposite to said outlet, and means for varying the area of the constriction in accordance with the quantity of fluid traversing the separator.

3. In a separator, the combination, with a collector chamber of large area, of an inlet pipe entering said chamber, a deflector enveloping the end of said inlet pipe to reverse the direction of travel of incoming fluid and forming with said inlet pipe a constricted channel having a conical wall at its narrowest part, said deflector and said inlet pipe constituting companion parts one of which is adjustable relatively to the other to vary the area of the constricted channel, and means for holding the adjustable part in adjusted position.

4. In a separator, the combination, with a collector chamber of large area, of an inlet pipe entering said chamber, a resiliently mounted deflector enveloping the end of said inlet pipe to reverse the direction of travel of incoming fluid and forming with said inlet pipe a constricted channel having a conical wall at its narrowest part, and an outlet from said chamber in the rear of said deflector.

5. In a separator, the combination, with a collector chamber of large area, of an inlet pipe leading to said chamber, a deflector in the path of incoming fluid constricting its available channel, said deflector being mounted to move under the action of the incoming fluid so as to vary the area of the constriction in accordance with the quantity of fluid supplied, and an outlet from said chamber in the rear of said deflector.

6. A separator, comprising a collector chamber of relatively large area, an upwardly directed inlet pipe opening into said collector chamber, a cup-shaped deflector enveloping the end of said inlet pipe and forming therewith a constricted and downwardly directed channel, a stem on said deflector slidably mounted in said chamber, a spring around said stem pressing said deflector towards said inlet pipe, and an outlet from said chamber above said inlet pipe and deflector.

7. A separator, comprising a collector chamber of relatively large area, an upwardly directed inlet pipe opening into said collector chamber, a deflector enveloping the end of said inlet pipe and forming therewith a constricted and downwardly directed channel, said deflector being movable with respect to said pipe under the action of the incoming fluid to vary the area of the restricted channel in accordance with the quantities of fluid supplied, and being adjustable independently of such movement to vary the minimum area of the constricted channel, means for supporting the deflector in adjusted position, and an outlet from said chamber above said inlet pipe and deflector.

8. In a separator, the combination of a collector chamber of large area, an inlet pipe entering said chamber, a deflector enveloping the end of said pipe for reversing the direction of travel of the stream of incoming liquid and forming with said pipe a constricted channel, an outlet from said chamber located above the deflector, a float chamber communicating with the collector chamber, a float in the float chamber, and means controlled by said float for cutting off the supply of liquid.

In testimony whereof I have signed my name to this specification.

JEAN ZWICKY.